(12) United States Patent
Scheinert et al.

(10) Patent No.: US 7,477,920 B2
(45) Date of Patent: Jan. 13, 2009

(54) SYSTEM AND METHOD FOR AUTOMATICALLY CONFIGURING AND INTEGRATING A RADIO BASE STATION INTO AN EXISTING WIRELESS CELLULAR COMMUNICATION NETWORK WITH FULL BI-DIRECTIONAL ROAMING AND HANDOVER CAPABILITY

(75) Inventors: Stefan Scheinert, San Diego, CA (US); Peter Lange, Bilgola (AU)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 10/913,877

(22) Filed: Aug. 6, 2004

(65) Prior Publication Data

US 2005/0148368 A1 Jul. 7, 2005

Related U.S. Application Data

(63) Continuation-in-part of application No. 10/280,733, filed on Oct. 25, 2002, now Pat. No. 7,117,015.

(60) Provisional application No. 60/492,825, filed on Aug. 6, 2003.

(51) Int. Cl.
*H04B 1/38* (2006.01)
*H04Q 7/20* (2006.01)
(52) U.S. Cl. .................. 455/561; 455/423; 455/424; 455/426.2; 455/436; 455/439
(58) Field of Classification Search ............... 455/423, 455/561, 436, 439, 424, 426.2
See application file for complete search history.

(56) References Cited

U.S. PATENT DOCUMENTS 5,280,471 A * 1/1994 Kondou et al. ............... 370/347
5,551,064 A * 8/1996 Nobbe et al. .................. 455/62
5,561,841 A * 10/1996 Markus ...................... 455/446

(Continued)

FOREIGN PATENT DOCUMENTS

EP 505106 A2 * 9/1992

OTHER PUBLICATIONS

Translation of Notice of Preliminary Rejection for Korean Patent Application No. 10-2006-7002490 mailed Jan. 30, 2007, 3 pgs.

(Continued)

*Primary Examiner*—Vincent P Harper
*Assistant Examiner*—Marisol Figueroa
(74) *Attorney, Agent, or Firm*—Blakely, Sokoloff, Taylor & Zafman LLP (57) ABSTRACT

A radio base station in a mobile communication network collects information about the network and exchanges data with a configuration device, the Internet System Manager (iSM). The iSM automatically configures and integrates the base station into the network by defining configuration parameter settings that allow fill interoperation of the base station with the network, with regards to roaming and handover in particular, without the need to add or modify parameter settings in other existing network elements. A very large number and high geographical density of such base stations is supported with full interoperation between them, allowing to overcome limitations of conventional mobile communication networks in this regard, by utilizing a certain combination of parameter settings and a new method to address the different base stations in the network.

35 Claims, 5 Drawing Sheets

U.S. PATENT DOCUMENTS

| | | | |
|---|---|---|---|
| 5,568,654 A * | 10/1996 | Fukawa | 455/456.3 |
| 5,787,344 A | 7/1998 | Scheinert | |
| 5,864,764 A * | 1/1999 | Thro et al. | 455/561 |
| 5,910,946 A | 6/1999 | Csapo | |
| 6,047,183 A * | 4/2000 | Kingdon et al. | 455/440 |
| 6,128,496 A | 10/2000 | Scheinert | |
| 6,292,891 B1 * | 9/2001 | Bergenwall et al. | 713/151 |
| 6,370,378 B1 * | 4/2002 | Yahagi | 455/433 |
| 6,405,048 B1 * | 6/2002 | Haartsen | 455/464 |
| RE37,820 E | 8/2002 | Scheinert | |
| 6,459,900 B1 | 10/2002 | Scheinert | |
| 6,496,700 B1 * | 12/2002 | Chawla et al. | 455/435.2 |
| 6,603,975 B1 | 8/2003 | Inouchi et al. | |
| 6,636,742 B1 | 10/2003 | Torkki et al. | |
| 6,711,388 B1 * | 3/2004 | Neitiniemi | 455/127.1 |
| 6,944,426 B1 | 9/2005 | Esser et al. | |
| 2002/0075846 A1 | 6/2002 | Valentine et al. | |
| 2002/0089951 A1 | 7/2002 | Hyun et al. | |
| 2002/0131387 A1 | 9/2002 | Pitcher et al. | |
| 2003/0031130 A1 * | 2/2003 | Vanghi | 370/235 |
| 2003/0073455 A1 * | 4/2003 | Hashem et al. | 455/525 |
| 2003/0109254 A1 | 6/2003 | Motegi et al. | |
| 2003/0115362 A1 | 6/2003 | Tarvainen et al. | |
| 2004/0209602 A1 * | 10/2004 | Joyce et al. | 455/414.1 |

OTHER PUBLICATIONS

Translation of Notice of Final Rejection for Korean Patent Application No. 10-2006-7002490 mailed Mar. 30, 2008, 3 pgs.
International Application No.: PCT/US04/25487, PCT International Search Report and Written Opinion, Jul. 19, 2006.

* cited by examiner

| N 1 | N 2 | N 3 | N 4 | N 5 | N 6 | N 7 | N 8 | N 9 |
|---|---|---|---|---|---|---|---|---|
| CGI 1 (LAC 1, CI 1) | CGI 2 (LAC 2, CI 2) | CGI 3 (LAC 3, CI 3) | CGI 4 (LAC 4, CI 4) | CGI 5 (LAC 5, CI 5) | CGI 6 (LAC 6, CI 6) | CGI 7 (LAC 7, CI 7) | CGI 8 (LAC 8, CI 8) | CGI 9 (LAC 9, CI 9) |
| FREQ 1 | FREQ 1 | FREQ 1 | FREQ 2 | FREQ 2 | FREQ 2 | FREQ 3 | FREQ 3 | FREQ 3 |
| BSIC 1 | BSIC 2 | BSIC 3 | BSIC 1 | BSIC 2 | BSIC 3 | BSIC 1 | BSIC 2 | BSIC 3 |

SYSTEM AND METHOD FOR AUTOMATICALLY CONFIGURING AND INTEGRATING A RADIO BASE STATION INTO AN EXISTING WIRELESS CELLULAR COMMUNICATION NETWORK WITH FULL BI-DIRECTIONAL ROAMING AND HANDOVER CAPABILITY

RELATED APPLICATIONS

This application claims the benefit of U.S. provisional application No. 60/492,825, filed Aug. 6, 2003. This application is a continuation-in-part of U.S. non-provisional application Ser. No. 10/280,733, filed Oct. 25, 2002 now U.S. Pat. No. 7,117,015.

FIELD OF THE INVENTION

The present invention relates in general to wireless communication and more specifically to the Internet Base Station (iBS) described in U.S. patent application Ser. No. 10/280,733 entitled "Internet Base Station".

BACKGROUND OF THE INVENTION

Figure 1:
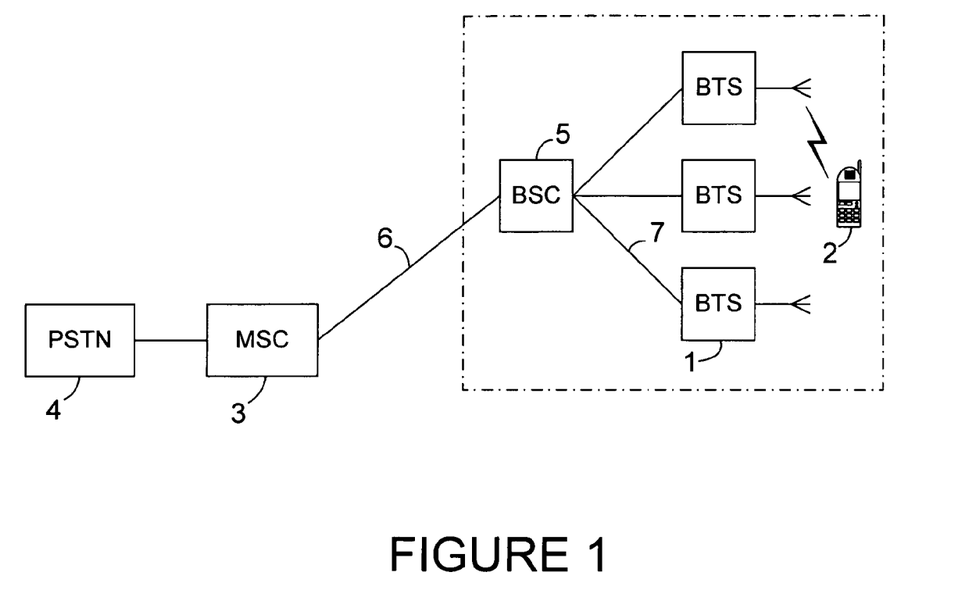
FIG. 1 is a diagram of a conventional telecommunications network.

As shown in FIG. 1, base stations (Base Transceiver Stations, BTS) 1 in a mobile communication network provide wireless communication with mobile stations (MS) 2. Each BTS 1 has a limited range and therefore limited coverage area so that many base stations with adjacent coverage areas are needed to provide contiguous service to the mobile stations. The coverage area of a BTS is also referred to as a radio cell. In a cellular network of this kind, several Mobile Switching Centers (MSC) 3 typically exist that, on one hand, provide connections of the mobile network to other communication networks such as, for example, the wire line public switched telephone network (PSTN) 4, and on the other hand are typically connected to several Base Station Controllers (BSC) 5 that, in turn, typically control several BTSs in a geographical area. Since the MSC, BSC and BTS are typically in different locations, transmission facilities 6, 7 are required between these locations which could take the form of transmission lines, microwave radio links, or sometimes satellite links.

In conventional mobile communication networks today, the configuration and integration of new base stations is a very complex, time-consuming and error-prone task that requires careful planning and manual execution by the network operator's skilled engineering staff. Configuration of radio base stations with a number of parameters and their integration into the surrounding network is necessary to facilitate proper and interference-free operation of the base stations themselves, and also their interoperation with other neighboring base stations, in particular with regards to "roaming" and "handover". Roaming means the uninterrupted accessibility of a mobile device for making or receiving phone calls or other wireless communication while traveling through the service areas of different base stations. Handover means the uninterrupted continuation of an ongoing wireless communication while the mobile device is moving from the service area of one base station into that of another base station.

The parameters that need to be defined for each base station and coordinated with parameters of other base stations include radio frequencies, transmit power levels, lists and parameters of neighboring base stations (neighbor lists), and several numbering schemes, including the Base Station Identity Code (BSIC), the Cell Identifier (CI) and the Location Area Identifier (LAI). These parameters need to be entered not only into the base stations themselves but into other network elements as well, namely the corresponding BSCs and MSCs. Furthermore, reconfiguration of existing base stations and other network elements becomes necessary as new base stations are added or other changes occur in the network. The effort and cost of this work is immense, given the large number and high geographical density of conventional base stations in present-day cellular networks.

Another issue addressed here is the mobility of iBSs and the verification process for checking if an iBS is in the licensed area or not. This is a new problem, since in the past the base stations were owned and installed by the carrier. By introducing a new generation of base stations which are much smaller and can easily be moved (unlike cell towers), mobility of "fixed" base stations is an issue which is addressed here as well.

SUMMARY OF THE INVENTION

IBS 8 (FIG. 2) is described in detail in commonly owned U.S. application Ser. No. 10/280,733, filed Oct. 25, 2002, which is incorporated by reference. The subject matter of U.S. Ser. No. 10/280,733 is published in corresponding (and commonly owned) International Publication No. WO 2004/040938.

Figure 2:
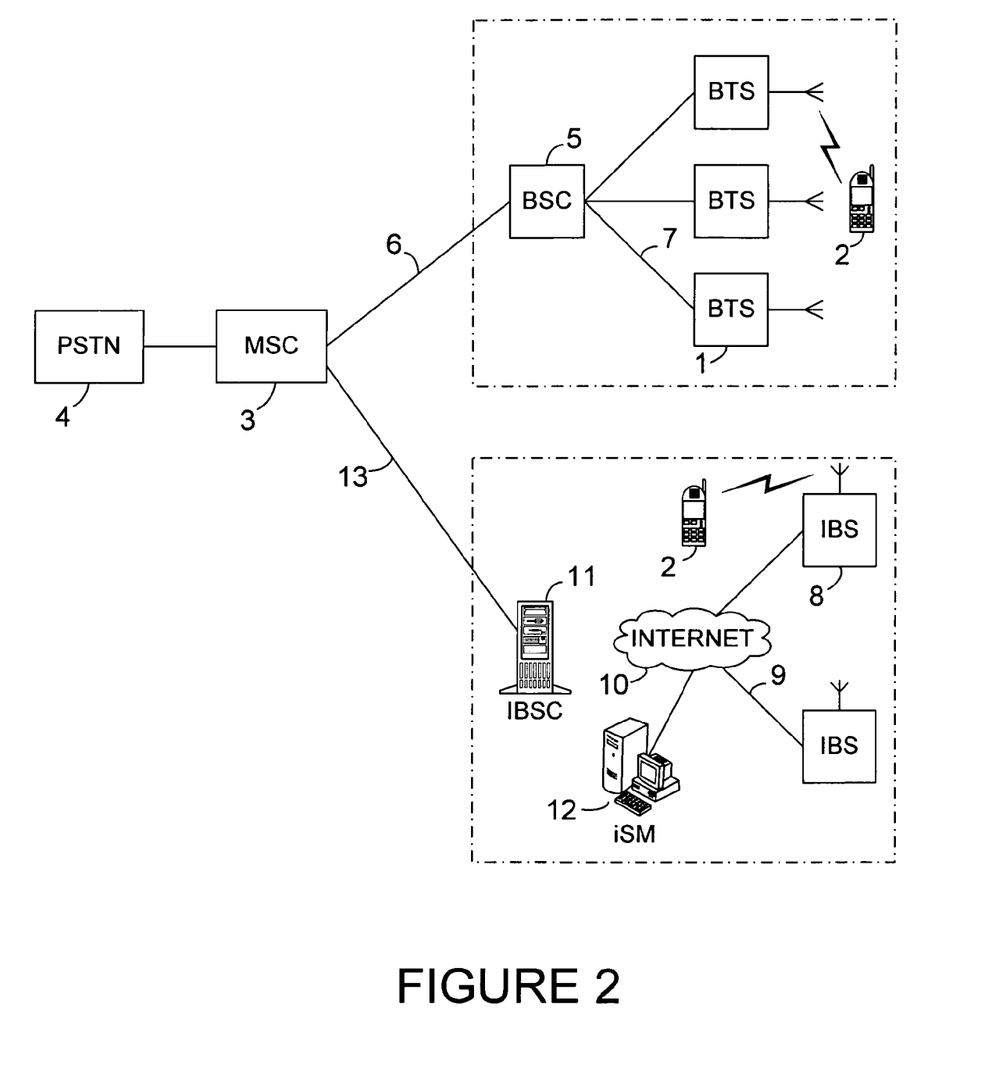
FIG. 2 is a diagram of an iBS network in combination with the elements of a conventional wireless communication network according to the present invention.
Figure 3:
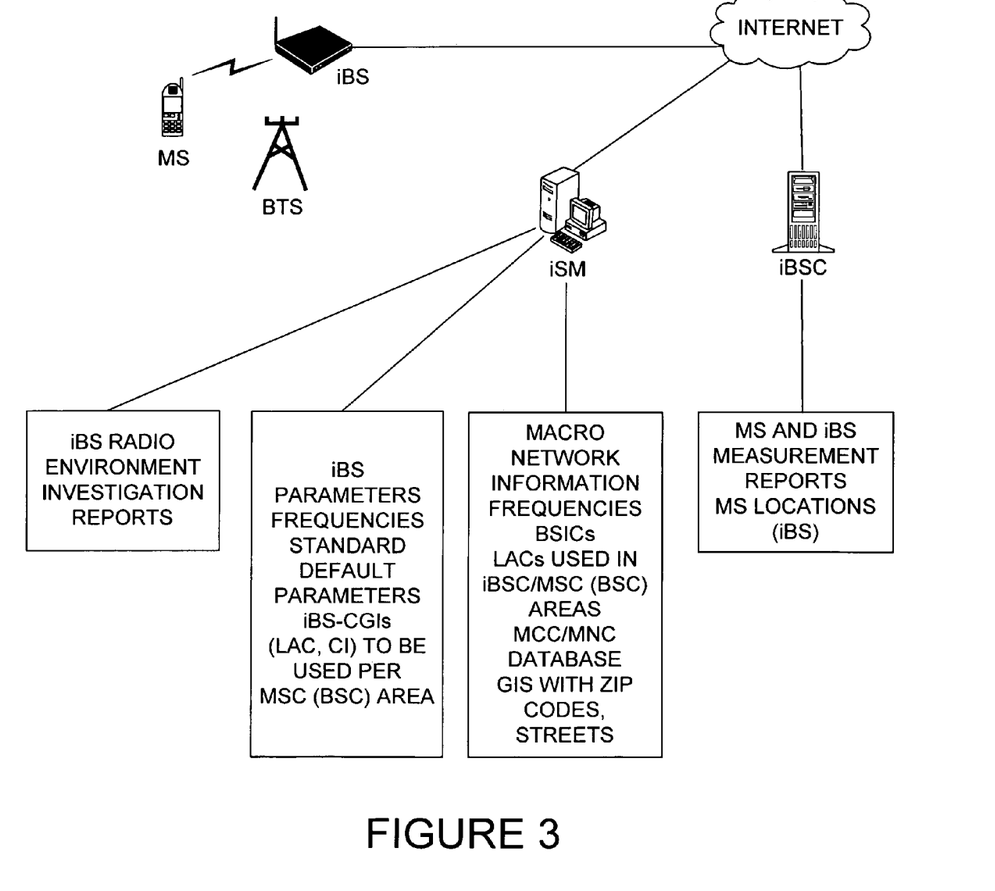
FIG. 3 is a diagram showing the interfaces of the iBS and the iSM and the various data sources used for automatic iBS configuration and integration.

IBS 8 is an Internet base station that is intended to provide or improve coverage and traffic capacity for mobile communication services at a user's home, office or other premises, or public areas. Even greater numbers and densities are envisaged for iBS than those of conventional base stations (millions vs. thousands per network). The iBS utilizes the user's existing Internet connection 9 and the public Internet 10 to connect to an Internet Base Station Controller (iBSC) 11 and Internet System Manager (iSM) 12. IBSC 11 is most likely co-located and connected with MSC (Mobile Switching Center) 3 of a conventional mobile communication network (in which case, transmission facility 13 is a local, on-site connection between the two devices) and controls and directs mobile communication between MSC 3 and several, typically many iBS units 8. ISM 12 assists iBS units 8 during their automatic configuration and integration into the surrounding network of conventional base stations and other iBS units.

IBS 8 is intended to be set up and put into operation by the user, without any support or action from network operator staff being required. A method is therefore required to fully automatically configure iBS 8 and integrate it into the surrounding cellular network once the user applies power and connects the unit to the Internet. In particular, the method must also ensure that no changes need to be applied to the configuration of other existing conventional base stations, their Base Station Controllers or Mobile Switching Centers when an iBS is put into operation by a user.

In an exemplary embodiment of the invention, an Internet Base Station (iBS) collects information about a surrounding mobile communication network by receiving transmissions from other surrounding base stations and exchanging data with a configuration device (the Internet System Manager, iSM). Based on this data and other information previously stored in the iSM, the iSM then automatically determines a number of suitable configuration parameters for the iBS to allow for proper and interference-free operation of the iBS and for the interoperation of the iBS with other neighboring base stations—conventional base stations as well as other iBS—in particular with regards to "roaming" and "handover" as described above. The need to add or modify configuration parameters in conventional network elements—conventional base stations (BTS), their Base Station Controllers (BSC) or Mobile Switching Centers (MSC)—to allow for interoperation with the iBS is avoided by previously applying a certain set of pre-defined parameters to these conventional network elements one time only. A certain combination of parameter settings and a certain method to address different iBS in the network allows to overcome limitations of conventional mobile communication networks with regards to the number and geographical density of base stations that can be supported, making the deployment of very large numbers of base stations in very high densities possible while maintaining full interoperation between them.

The iSM further integrates the iBS into the existing network by assigning it to a particular one of typically several Internet Base Station Controllers (iBSC) in the network, in order to optimize interoperation and minimize transmission resources needed.

The procedure described here applies not only to iBSs but also to conventional base stations that might be managed by an iSM and connected to MSCs via an (i)BSC.

Other features, objects and implementations of the invention will be or will become apparent to one with skill in the art upon examination of the following figures and detailed description. All such additional features, objects and implementations are intended to be included within this description, to be within the scope of the invention and to be protected by the accompanying claims.

DETAILED DESCRIPTION OF THE INVENTION

As an exemplary embodiment, an iBS supporting the GSM standard and the parameters and procedures necessary for its integration into and operation in a GSM mobile communication network is described. The invention is however not limited to GSM technology but supports other technologies, such as CDMA, iDEN and 3G/UMTS, as well.

1. Investigation of Radio Environment

When an iBS is switched on it will investigate its radio environment and then define, with the aid of the iBSC and/or iSM, a number of parameters necessary to integrate into and operate in an existing mobile communication network.

The iBS's receiver is able to receive not only in the uplink band, its normal band of operation, but also in the downlink band in which Mobile Station (MS) receivers normally operate.

When switched on, the iBS will first scan the entire downlink frequency band, like an MS would when switched on. Through this downlink band scan the iBS will identify macrocells operating in the area as well as other iBSs. (Note that the term "macrocell" is used here for any non-iBS radio cell, so it could also refer to a conventional microcell and not necessarily only to a true classical macrocell). The iBS will look for BCCH signals (Broadcast Control Channel) and decode the CGI (Cell Global Identifier) and the BSIC (Base Station Identity Code) that are broadcast there. The CGI consists of the LAI (Location Area Identifier) and the CI (Cell Identifier). The LAI consists of the MCC (Mobile Country Code), the MNC (Mobile Network Code), and the LAC (Location Area Code). The iBS will look for cells that are part of its carrier's network (identifiable by the MCC and MNC) and report to the Internet System Manager (iSM):

the BCCH frequencies (ARFCN),
the received signal levels (RXLEV),
the received qualities (RXQUAL),
the CGIs,
the BSICs,
and other information, which are broadcasted by other iBS (like a unique iBS code).

The reported cells are potential handover neighbors to the iBS, provided their signal levels are strong enough. The iSM will evaluate the measured signal levels and decide which cells will be defined as neighbor cells to the iBS based on the field strength. Furthermore, the macrocell information reported by the iBS will serve to create the "iBS pointer list" in the iBSC (see section 2.6.4) which will play a major role in macro-to-iBS handovers.

Should no cells belonging to the iBS carrier's network be identified during the downlink scan, the iBS will be in an area without coverage by that carrier. In that case, the iBS will then report to the iSM all other cells it can receive which will allow the iSM to determine (by analyzing the MCC and MNC) whether the iBS is actually located in the country and/or the market as specified by the user. The iBS may even scan "non-country" frequencies. For example: The iBS is supposed to be in the USA (1900 MHz); then the iBS will scan also frequencies for 900 and 1800 MHz (Europe and Asia).

Another embodiment of the invention is that the iBS has an integrated GPS receiver and reports the location to the iSM. The iSM could then use the coordinates to first cross check the entered address of the iBS and second determine which cells should be neighbors of this iBS cell.

The carrier (mobile network operator) will have reserved a number of frequencies in his available frequency spectrum exclusively for iBS use (and not use by macrocells). The downlink scan will also provide information about interference on those iBS frequencies and possibly on the adjacent macrocell frequencies and thus aid with the selection of a suitable operating frequency for the iBS itself as described in section 2.1.

2. iBS Parameter Definition

Like with conventional base stations, most iBS configuration parameters will be default settings to be set by the network operator one time only, with only occasional deviation from the default values.

In order to enable handovers from macrocells into iBS cells, the iBS cells must be listed as neighbors in the neighbor cell descriptions of the macrocells. These neighbor cell descriptions are resident in the BSCs and the frequency an iBS uses must also be contained in the neighbor list of all neighboring cells. One objective of the invention is to avoid any software changes in existing BSCs and MSCs and the need for modification of these neighbor lists and neighbor cell descriptions when a new iBS goes online.

Furthermore, the BSCs of most of the major GSM system manufacturers do not allow entering more than 32 neighbor cell relations for any one cell.

Therefore, the descriptions of iBSs as neighbor cells to macrocells (which includes the iBS's frequency, LAI, CI and BSIC) must be static and pre-defined in the macrocell BTSs and BSCs, and the number of different LAIs, Cis and BSICs that iBSs can use is limited. With a very large number of iBSs expected to be in use, this means that all iBSs in a network are sharing a limited, much smaller number of LACs, Cis and BSICs. To the conventional GSM network and its switching/routing facilities (MSCs and BSCs) several iBSs in a group will then be appearing as 1 single cell with common cell parameters, and the iBSC will take care of the additional routing issues within such a group. On the other hand, it is desirable to keep the number of iBSs in such a group as small as possible in order to minimize the amount of control traffic in the network required for roaming and call setups.

Most conventional cells in most networks have around 10 neighbor cells, which leaves about 20 neighbor definitions (out of the maximum of 32) available for iBS. Some macrocells in particular environments (e.g. with radio propagation across water) will however have a significantly higher number of neighbor relations already without iBS. A network configuration is therefore recommended to operators as a starting point with a relatively small number of cell parameter sets reserved for iBS which can be extended later as the number of iBSs in the network rises—for example:

3 frequencies (ARFCN) reserved for iBSs network-wide ("iBS frequencies")
3 BSICs reserved for iBSs network-wide ("iBS BSICs")
9 neighbor relations (adjacencies) with iBSs defined in every macrocell (with 9 different CGIs that consist of 9 different LACs and Cis in each MSC area)

Figure 4:
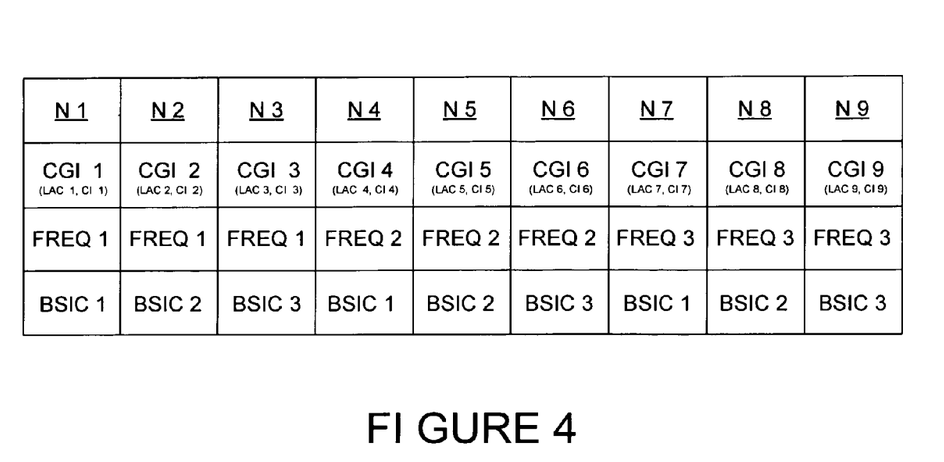
FIG. 4 is a table setting forth an example of the parameter combination of CGI (cell global identifier), BSIC (base station identity code) and ARFCN (frequency) used for a conventional macrocell in its e.g. nine neighbor cell definitions N pointing at iBSs as target cells.

An example of this parameter combination of CGI (Cell Global Identifier), BSIC (Base Station Identity Code) and ARFCN (frequency) used for a conventional macrocell in its e.g. 9 neighbor cell definitions N pointing at iBSs as target cells is shown in FIG. 4.

A Base Station Controller (BSC/iBSC) that allows significantly more neighbor relations per cell than the 32 or 64 offered by system manufacturers today would be the key to overcoming the limitations described above and allow for unambiguous addressing of very high numbers of self-configuring and self-integrating base stations in accordance with otherwise unmodified standard system procedures. Such a method is therefore also a part of this invention. The following paragraphs describe a solution for existing conventional BSCs allowing only 32 or 64 neighbor relations per cell.

2.1 Operating Frequency (ARFCN)

Based on the (downlink) interference measurement described above in section 1 and information stored in the iSM about frequencies reserved by the network operator exclusively for iBS use (iBS frequencies), the iSM will assign to the iBS the iBS frequency with the lowest or first acceptable interference levels found. In the event of equal minimal interference levels on several of the available iBS frequencies, or in the absence of any interference on all of the iBS frequencies, an iBS frequency is assigned to the iBS by a random number generator or in a cyclic assignment procedure in order to ensure an even distribution of the use of all available iBS frequencies across the network which will minimize the overall risk of interference in the long term. Another possibility is that the iSM will pick the frequency of the most distant cell.

Alternatively to the use of a certain number of reserved exclusive iBS frequencies as described above, iBSs may share the BCCH frequencies of the conventional base stations in the network. The operating frequency for an iBS may then either be selected from among all BCCH frequencies used in the entire network, or from among only those BCCH frequencies of the strongest macrocell's neighbor cells, which the iBS will find out by listening to the strongest macrocell's neighbor list broadcast. In both cases, the iBS will report the received signal strengths on the relevant frequencies to the iSM and the iSM will assign the frequency to the iBS with the lowest interference signal levels.

Independent of the frequency assignment method used, the iBS will continuously monitor the radio environment, i.e. the signal levels and bit error rates received from Mobile Stations served, as well as the signal levels and bit error rates received and reported by the Mobile Stations. Should poor radio conditions be found to persist over a longer period of time, the iBS will initiate a re-assignment of a new frequency.

2.2 Transmit Power Level

The transmit power level of the iBS is initially set to a default value defined by the carrier. It may be adjusted, between a minimum and a maximum limit, according to a user's particular environment—e.g. whether he intends to provide coverage to an apartment only, a house with garden, or larger premises, indoors or outdoors, or public places—either according to manual user input, determined automatically: The power level resulting from user input may for example be overwritten by a more suitable value based on the number of neighbor cells that the iBS can receive during the radio environment investigation as described in section 1 which gives an indication whether the iBS is installed indoors or outdoors, in an exposed or confined location etc.

Furthermore, the actual transmit power of the iBS is adjusted to the current radio conditions continuously based on the average signal levels and/or bit error rates received and reported by Mobile Stations served, which the iBS will continuously monitor. For example, if the average received signal level is low, the transmit power may be increased; if the received signal level is high, the transmit power may be decreased.

If the received bit error rate is high (poor link/signal quality) the transmit power may be increased up to a given threshold.

The iSM can be programmed in such away, that the carrier can enter:

default transmit output power (e.g. 10 mW)
power increment/decrement in dB steps (e.g. +/−2 dB)
minimum/maximum output power (e.g. 1 mW; 100 mW)
number of calls to do output power update (n=3)

In this case the iBS will start with the default value of 10 mW (unless it sees too many neighbors during the setup phase). After 3 calls the iBS or the iSM will compute the "average" and min/max values of the field strength and decide if the output power should be the same, reduced or increased. The min max values of the output power will be always maintained (no lower than 1 mW; not higher than 100 mW).

Instead of using a fixed value of number of calls, it could be variable over time; which means, initially n=1 and then n= 2 . . . etc; so that n is increased over time since the radio environment will be more stable in a later phase.

2.3 LAC (Location Area Code)

The LAC is needed for the establishment of Mobile Terminating Calls (MTC) and the Location Update procedure. It is also part of the CGI which is used by the BSC and MSC to address the target cell in a handover.

Every cell in a conventional network belongs to a Location Area and broadcasts its LAC on the BCCH. The MSC (Mobile Switching Center), when receiving a call destined for a particular Mobile, will send a Paging command (via the BSC) to all cells in the Location Area where the Mobile is currently registered.

A Mobile roaming the network will perform the Location Update procedure (see section 3.2.2) and send a corresponding command to the MSC/VLR (Visitor Location Register) when entering a new Location Area. The Mobile identifies that it has entered a new Location Area when it detects that the new cell has a different LAC than the cell that the Mobile was "camping" on before, i.e. the cell that had the strongest signal before. (Note: When the new LAC belongs to a different MSC/VLR, the Mobile's new location also needs to be updated in the HLR—Home Location Register).

iBSs use separate LACs from macrocells in order to reduce the number of unnecessary Paging commands they receive from the MSC (via the iBSC) and which they would then have to transmit on the air interface. (If sharing LACs with their surrounding macrocells, IBSs would have to handle all Paging commands for that particular Location Area, most of which would be for mobiles actually being served by the macrocells).

This strategy of separate LACs for iBSs and macrocells also makes it easier to prevent fast-moving Mobiles passing through an iBS coverage area from camping on the iBS (which would then only occur when the Cell-Reselection Hysteresis parameter is exceeded. This is desirable in cases where the iBS coverage area is small and where typically only slow-moving or stationary Mobiles are found.

Given the total number of 65535 different LACs that exist, the definition of a sufficiently large set of exclusive LACs for iBS (iBS-LACs, separate from those LACs used for macrocells) does not present a problem to a network operator, since only e.g. 9/max. 32 different LACs would be needed/possible per MSC or, in an iBS network expansion as described in section 2.7, per BSC.

In order to avoid HLR updates when a Mobile enters or leaves an iBS cell, the boundaries of the iBS Location Areas are coordinated by the iSM with those of the MSC/VLR-areas—in other words: An iBS is assigned to a Location Area that is controlled by the same MSC that also controls the Location Area(s) that the iBS's surrounding strongest macrocell belongs to. The LACs of surrounding macrocells are identified by the iBS during the radio environment investigation described in section 1. In addition, the iSM has a reference database showing which LACs belong to which MSC. As an ideal situation for creating this database it is recommended to the network operator to organize his LACs in a way that their first few digits directly identify the MSC they belong to.

Through this strategy of assigning an iBS to the same MSC as its macrocell neighbor(s), Inter-MSC handovers (which require more signaling resources than Intra-MSC handovers) are completely avoided. All handovers involving iBSs are then Intra-MSC handovers, resulting in more efficient handover signaling/channel activations and also more efficient Paging traffic distribution across the network.

For the same reasons there should be at least 1 iBSC per MSC, co-located with the MSC in order to reduce/eliminate MSC-iBSC line/transmission costs.

As described in section 2, fixed parameters (CGI and BSIC) for all iBSs are pre-defined in every macrocell's neighbor cell description (resident in the BSCs), in order to allow iBSs to be put into operation by their users at unpredictable times and in unpredictable numbers and locations without the need to manually add or modify configuration parameters. The CGI contains the LAC and CI. The e.g. 9 CGIs for iBS (iBS-CGIs) in an MSC area (see section 2) all contain different LACs, and these 9 iBS-LACs are different ones in each MSC. This way, the iBSs in an MSC/iBSC area and across the whole network are distributed into a maximum number of Location Areas (e.g. 9 per MSC) so that the amount of unnecessary Paging traffic during Mobile Terminating Calls (MTC) is kept to a minimum. The e.g. 9 iBS-LACs to be used in an MSC area have to be specified in the MSC when an iBSC is connected to it. When an iBS is switched on, it will listen to the LAC of its surrounding macrocell neighbor(s) and report these to the iSM. The iSM will decide to which MSC/iBSC this iBS will be linked, based on its database of which LACs belong to which MSC in the network, and issue a CGI to the iBS (which contains the chosen LAC). The iBS needs the CGI for handover and call setup signaling with the iBSC/MSC and has to broadcast it on its BCCH.

Alternatively to the method described above, the iSM's decision which iBSC it links an iBS to may be based on the information an iBS user provides about his location when activating an iBS, in combination with a more detailed geographical database in the iSM showing zip code areas and/or individual streets.

In addition to the requirements for LAC assignments to iBSs as described above, the iSM uses a choice of a cyclic or a random procedure to decide which of an iBSC's e.g. 9 LACs it assigns to a new iBS and counts the number of assignments of each LAC so that an even distribution of an iBSC's e.g. 9 LACs among its iBSs is ensured (in order to optimize the Paging traffic distribution and handover signaling/channel activations).

In the same way, the iSM also ensures that as little re-use as possible occurs among the CGIs (CGI=LAI+CI) of iBSs that are on a macrocell's "iBS pointer list" (see section 2.6.4), in order to minimize the number of iBSs that have to be addressed in parallel in a macrocell-to-iBS handover (see section 3.2.1) and therefore the signaling overhead associated with this.

Another embodiment of the invention is to simply change the interface specifications and allow longer LAI, CI and larger neighboring lists.

2.3.1 LACs in Immediately Adjacent iBSs iBSs that are immediately adjacent to each other should have the same LAC so that the Location Update procedure is not necessary every time a Mobile crosses the cell boundary between them. Such iBSs are likely to be operated by the same owner on the same (extensive) premises so that Mobiles will probably very often cross that cell boundary.

On the other hand, when the VLR functionality in the iBSC is used (see section 3.1.1.1), the opposite is proposed: Immediately adjacent iBSs then have different LACs.

When switched on, a new iBS will carry out the radio environment investigation (see section 1) and determine whether it can receive other iBSs. If so, it will decode the LACs of these other iBSs and report them to the iSM. The iSM will determine that these other iBS are immediately adjacent to the new iBS if their signal levels are above a certain threshold and then ensure that the new iBS gets the same LAC or a different one, depending on whether the VLR functionality in the iBSC is used or not. The iSM could decide if the iBSs are "same-owner" neighbors if the subscriber has multiple iBSs at the same location registered.

2.4 CI (Cell Identifier)

CIs in a GSM network have to be unique within a Location Area but can be reused outside of a Location Area. Since the e.g. 9 LACs in the 9 CGIs in the 9 iBS neighbor relations of every macrocell are all going to be different across the whole network, a single CI could theoretically be used for all iBSs across the whole network. It is recommended, however, that the (e.g.) 9 CIs used for iBS in each MSC/iBSC area should also all be different across the whole network in order to allow for more detailed iBS identification in possible future applications. Given the total number of 65535 different CIs that exist, the definition of a sufficiently large set of CIs for iBS does not present a problem to a network operator, since only e.g. 9/max. 32 different CIs would be needed/possible per MSC or, in an iBS network expansion as described in section 2.7, per BSC. These iBS-CIs would not even necessarily have to be separate from CIs used for macrocells, but a CI assignment strategy without any re-use is recommended anyway, again, in order to allow for possible future applications.

So the iBS CI assignment strategy is as follows: For each MSC/iBSC area the iSM has e.g. 9 CGIs reserved for assignment to iBSs. The 9 LACs and the 9 CIs contained in these CGIs are all different from each other and are also not re-used anywhere else in the network. When a new iBS is switched on, the iSM will determine which MSC/iBSC it should be linked to (based on the LAC of the iBS's strongest macrocell neighbor as described in section 2.3) and assign to the iBS one of that iBSC's 9 iBS-CGIs (which contains a network-wide unique LAC and a network-wide unique CI-note though that this CGI will be shared by all iBSs in that Location Area, which is necessary so that a fixed, limited number of neighbor relations with iBSs, e.g. 9, can be pre-defined in the conventional BSCs).

2.5 BSIC (Base Station Identity Code)

The BSIC is needed in the handover process. It is broadcasted on the SCH (Synchronization Channel) of every cell in a conventional network. The Mobile decodes the BSIC on those frequencies that it is monitoring according to the neighbor list it was given by its serving cell and reports them in its measurement reports to the BSC. The BSC has a reference list which BSICs belong to the actual neighbor cells of the serving cell (the neighbor relations list or adjacency list) and decides whether the signal heard by the Mobile is indeed the actual neighbor cell or a co-channel signal from another (distant) cell (with a different BSIC). The BSC then makes the handover decision accordingly.

The rule in conventional network planning therefore is: Cells in vicinity of each other that use the same BCCH/SCH frequency must have different BSICs. "Vicinity" in this context means: Close enough so that they could be common neighbors to another cell.

The BSIC is 6 bits long which yields a maximum of only 64 different values. In border regions with other countries or markets, network operators have to coordinate the NCC (Network Colour Code—the first 3 bits of the BSIC) which means that in such border regions even fewer BSICs are available to each operator—in the worst case only 8. With a large number of iBSs in a network and the limited number of frequencies available for iBSs (e.g. 3) this means that, in contrast to "normal" GSM network planning rules, BSICs have to be re-used among iBSs with the same BCCH frequency even if those iBSs are in "vicinity" to each other (i.e. if they are neighbors to the same macrocell).

Moreover, BSICs of iBSs, like their LACs and CIs, will have to be pre-defined in the adjacency list of every macrocell (in the BSCs) where the number of neighbor relations with iBSs has to be limited (e.g. 9) for reasons explained earlier. If the chosen number of iBS neighbor relations in macrocells is 9 and the number of frequencies made exclusively available by the network operator for iBS use is 3, then the number of different BSICs that are required is 9 I 3=3. This would mean that 9 different combinations of BCCH frequency and BSIC are then possible and each of them would point at one of the 9 iBS-CGIs in a macrocell's adjacency list.

The only rule for the iSM to follow for the selection of the most suitable BSIC to be assigned to a new iBS is the following: In the event that a new iBS during its investigation of the radio environment (see section 1) receives some relevant signal strength (interference) on all e.g. 3 iBS frequencies, it should select the frequency with the lowest interference levels for its own operation as described in section 2.1 and then get a different BSIC from the one heard on that frequency.

In addition to the requirements for BSIC assignments to iBSs as described above, the iSM uses a choice of a cyclic or a random procedure to decide which of the e.g. 3 iBS-BSICs it assigns to a new iBS and counts the number of assignments of each iBS-BSIC so that an even distribution of the e.g. 3 iBS-BSICs across the network is ensured (in order to minimize in the long term the overall risk of ARFCN and BSIC co-assignments to iBSs in close vicinity to each other).

2.6 Neighbor Lists 2.6.1 Neighbor List of the iBS Itself

The RF Environment Investigation by the iBS when switched on (see section 1) has delivered a list of macrocells (and possibly other iBSs, too) that the iBS can receive, giving their BCCH frequencies, received signal levels, CGIs and BSICs.

The cells from that list that have a sufficient signal level (threshold to be defined in the iSM) shall be defined as neighbor cells to the iBS. Alternatively, only the strongest cell or for example the strongest 2 cells on the list may be defined by the iSM as neighbor cells to the iBS. The iSM will send a list of the relevant frequencies (ARFCN) back to the iBS as its neighbor list. (Note that the neighbor list stored in a GSM base station (BTS) is only a list of frequencies that the BTS broadcasts and instructs Mobiles in the area to monitor). Another possibility is that at least one macro cell is being defined as a neighbor.

The iSM will send to the iBSC (which will be responsible for the handover decisions, like a conventional BSC) a list of the defined neighbor cells of the iBS. This adjacency list contains the frequencies of the neighbor cells, their BSICs, LAIs and CIs and maybe other information (which were all obtained from the iBS's RF Environment Investigation, see section 1). Since several iBSs connected to this iBSC will share the same CGI (=LAI+CI), the iBSC has to use another parameter—the iBS's IP address, other internet/address related data or a serial number of the iBS in addition to the CGI to distinguish between these iBSs.

Either only the strongest or several or all macrocells identified can be defined by the iSM as neighbors to the iBS.

Other iBS that were detected in the RF Environment Investigation (see section 1) and that have a sufficient signal level are always defined by the iSM as neighbors of the iBS, and a reciprocal neighbor definition is set in the other iBS as well. These are likely to be other iBS that a handover is wanted with, owned by the same user, on the same (possibly extensive) premises. On top of this automatic assignment, the iBS user may manually apply neighbor definitions of other iBS that he owns and operates on the same premises.

As a part of the optimization phase the iBS may have a large number of neighboring cells are defined, e.g. all neighbor cells of the "home macro cell". The handover list might be initially smaller, for example only the home macro cell itself. While monitoring the link quality of the iBS calls, the iSM can decide to add or even change the handover target list, if during the calls the mobile sees another strong macro cell, which was initially not in the handover list of this iBS cell.

Another embodiment of the invention is that the neighboring list for the dedicated mode (while a mobile is carrying a call) consists of two groups:

Real neighboring list (as used in other base stations)
Interference neighboring list.

The interference neighboring list is not intended to perform a handoff into one of these cells. Usually the measurement reports of the mobile station are reporting the 6 strongest neighbors. In case we have 3 "real" neighbors and 3 "interference" neighbors, the mobile will in any case report these 6 channels regardless how low the field strength is. An even further development could use a dynamic list of "interference" neighbors and change the list periodically, so that more than 6 channels can be monitored.

The advantage of this method is, that the mobile can measure a potential new carrier for the iBS. If the new "interference" frequency is OK and does not have any interference with another macrocell, the iBS may be reconfigured to the new frequency. The neighbor list will then be updated and other "interference" neighbors are defined.

2.6.2 Neighbor Lists of Macrocells

A network operator intending to use iBS will add the e.g. 3 frequencies reserved for exclusive iBS use (iBS frequencies) to all macrocell BTSs in his network, in addition to their existing neighbor lists.

With e.g. 3 iBS frequencies to be used, in the (rather unlikely) event that some macrocells already have 30 or more frequencies in their neighbor list, some of these existing neighbor definitions in these macrocells in would have to be cleared so that 3 become available for iBS, since the maximum length of the neighbor list is 32 frequencies in the BSCs of most GSM system manufacturers.

As outlined earlier in section 2.1, the carrier may also use macrocell BCCH frequencies for the iBS.

2.6.3 Adjacency Lists (Neighbor Cell Descriptions) for Macrocells (in Conventional BSCs)

A number (e.g. 9—see section 2) of standardized, pre-defined neighbor relations for iBSs have to be added to the neighbor cell descriptions of every macrocell in the network so that handovers from macrocells into iBSs can take place. These neighbor cell descriptions are stored in the BSCs and contain each neighbor cell's ARFCN, BSIC and CGI. The CGI consists of the LAI and CI, and the LAI consists of the MCC, MNC and LAC.

With e.g. 3 frequencies and 3 BSICs reserved for iBSs, 9 different pairs ARFCN/BSIC are possible. Each of these points to 1 of 9 iBS-CGIs as the target cell. Each of these 9 iBS-CGIs are shared by a more or less large number of iBSs in a group.

The e.g. 9 iBS-CGIs are different ones in each MSC area, and they are also not re-used in other MSC areas. Within an MSC area, the 9 iBS-LACs contained in these 9 iBS-CGIs are also all different from each other for reasons explained earlier in section 2.3 so that the iBSs within an MSC area split into the maximum number of iBS Location Areas (e.g. 9) in order to minimize the amount of unnecessary Paging traffic.

If some macrocells in an MSC area where e.g. 9 different iBS-CGIs are to be used already have 24 or more neighbor relations, some of these existing neighbor relations would have to be cleared so that 9 become available for iBS, or the number of iBS-CGIs has to be reduced in that MSC area, since the maximum number of neighbor relations is 32 in the BSCs of most GSM system manufacturers (the BSC of one major manufacturer allows 64).

As outlined earlier in section 2.1, the carrier may also use macrocell BCCH.

2.6.4 "iBS Pointer Lists" in the iBSCs

In order to minimize the overhead in handover signaling and associated use of channel resources (see sections 3.2.1), the iBSC maintains an "iBS pointer list" for each macrocell that has iBSs as neighbors. This iBS pointer list indicates which iBSs (uniquely identified by their IP addresses, other internet/address related data or a serial number of the iBS) are neighbors to the macrocell. When a Handover Request from that macrocell then arrives at the iBSC, the iBSC can limit the number of iBSs that need to be addressed as possible handover targets to the ones on this list, instead of addressing all iBSs that share the CGI contained in the Handover Request message.

During the investigation of the radio environment (see section 1) the iBS reports to the iSM all macrocells that it can receive and certain parameters of those macrocells, among them their CGIs. (The iSM uses this information to define which macrocells should be defined as the iBS's neighbors for iBS-to-macrocell handovers). The iSM will now use the same information to create a list for each macrocell that has been defined as an iBS's neighbor, containing the CGIs and IP addresses of those neighboring iBSs.

An iBS pointer list as described above for macrocells must also be created for each iBS in order to optimize the signaling overhead in iBS-to-iBS-handovers (see section 3.2.3)—these iBS pointer lists will however be much shorter than the ones for macrocells since an iBS will typically have much fewer other iBSs as physical neighbors (if any) than a macrocell.

2.7 iBS Network Expansion

When the number of iBS used in a network reaches very high levels, the overhead in Paging and handover signaling I channel setups (caused by the sharing of CGIs as described earlier) can be reduced by taking the special cell parameter assignment as described from the MSC level to the BSC level:

The e.g. 9 CGIs shared by iBS in the macrocells' adjacency lists are then defined differently per BSC and not only per MSC anymore. This significantly reduces the number of iBSs that share the same CGI and therefore reduce the amount of overhead in Paging and handover signaling I channel setups.

The iBSs, in the configuration phase, would then identify in their investigation of the radio environment (see section 1) not only which MSC but also which BSC their adjacent macrocells belong to. This becomes possible when the network operator uses a LAC numbering scheme that not only identifies the MSC in for example the first few digits of the LAC but also the BSC in the following few digits.

LACs in the conventional network must then not overlap BSC areas.

The iSM would have a corresponding database of LACs used in the different BSC areas and then, as before, link the iBS to an iBSC that is connected to the same MSC as the strongest surrounding macrocell, but then assign to the iBS one of the e.g. 9 iBS-CGIs that belong to the BSC that the surrounding macrocell belongs to.

The VLR functionality in the iBSC (see section 3.1.1.1) reduces the Paging (MTC) signaling overhead even further.

Another embodiment of the invention is that with the handover request the coordinates of the mobile is included. In this case the iBSC will use this information to select the closest iBSs with the same parameters.

2.8 Optimization Phase for the iBS

Once the iBS is configured and active the iBS will do a number of performance measurements. For example the iBS will do idle channel supervision, which means if a TCH timeslot is not active, the iBS will measure interference from other iBS or macro cell mobiles.

Another method is that the iBS will analyze the up- and downlink quality of the calls and do some statistics (like average RXLEV and RXQUAL).

Based on these statistics the iBS might increase or decrease the output power. For example if the link margin is lower than specified, the output power can be increased as long as the maximum output power is not reached. This power setting is used for both stations: mobile and base station.

If there is a lot of interference (either uplink or downlink) the iBS can select another channel and use for example the procedure for the "interference" neighbors explained in 2.6.1.

Another embodiment of the invention is that the iBS transmits the signals with a "medium" output power. If the mobile receive a poor signal, the output power of the iBS could be increased, so the mobile will get a good signal again. This is specifically important for data transmission, since the receiver sensitivity for high data rates is reduced.

3. GSM Procedures with iBS

This section describes those procedures in a GSM network where the iBS-specific pre-assignment and sharing of certain cell parameters and the resulting signaling and channel activation overhead as described above plays a role.

3.1 Call Setup 3.1.1 Mobile Terminating Call (MTC)

In a GSM network, when an MSC receives an MTC for a particular Mobile, it will send a Paging command to all BSCs that control BTSs that belong to the Location Area where the Mobile has last performed the Location Update procedure. The BSCs will forward the Paging command to all of those BTSs which in turn will all transmit the Paging command on the air interface. The Mobile's response to the Paging command will only be received by the BTS where the Mobile actually is at the time—the Paging commands transmitted by all other BTSs in the Location Area remain unheard by the Mobile—and this BTS will then start communicating with the Mobile and signal back to the BSC (using its CGI for identification) to set up a channel to carry the call etc.

As explained earlier, several or many iBSs may share the same CGI, i.e. the same LAC and the same CI. This means that in an MTC to a Mobile that is currently located in an iBS cell, several iBSs may be addressed in parallel with the Paging command and requested to set up a channel to carry the call. Only the iBS actually receiving the Mobile's response to the Paging command will signal this back to the iBSC, the iBSC will then request all other iBSs that the Paging command was sent to to release the setup channels again. The iBSC uses the iBSs' IP addresses to distinguish between them, since the CGI that in a conventional network is normally used for this purpose is common to all iBSs involved.

3.1.1.1 VLR Functionality in iBSC for Optimized MTC Signaling

In order to reduce the signaling required for an MTC, the iBSC has its own VLR functionality (Visitor Location Register), which means that when a Mobile performs a Location Update procedure in an iBS cell, the iBSC keeps a record of which Mobiles are currently registered in which iBS cells. Provided that 2 iBS cells that are immediately adjacent to each other have different LACs (see section 2.3.1 for how this can be achieved), this reduces the signaling overhead in Mobile Terminating Calls (see section 3.1.1) or even virtually eliminates it: The iBSC, while it has location information about the Mobile stored, sends the Paging command only to that one iBS where the mobile currently is, i.e. the size of the Paging area is then effectively only 1 cell. This avoids the signaling overhead from having to page a Mobile in EVERY iBS with the specified LAC/CI, which would otherwise result because a group of several or many iBS share the same LAC/CI. The iBSC uses the individual IP addresses of the iBSs in such a group to distinguish between them and address them.

When a Mobile leaves the iBS cell area, it performs a Location Update procedure in a neighboring cell. If this new cell is itself an iBS, the iBSC updates the Mobile's location information, but in most cases the new cell would be a macrocell and not an iBS (but in any event a cell with a different LAC—see above) which would result in the Mobile's location being updated in the MSC, but the MSC currently does not inform the old BSC about the mobile's new position. The iBSC therefore would be left with invalid location information.

To overcome this problem, the iBSC's VLR will "poll" Mobiles regularly (similar to the GSM Periodic Location Update procedure) in order to find out whether they are still in the iBS cell area where they last performed the Location Update. Alternatively, since this procedure would also be using up signaling and channel resources, the iBSC will clear a Mobile's location information in its VLR database after a specified period of time that the Mobile has been inactive for. Should the Mobile then nevertheless have remained in the iBS cell area and the iBSC receives an MTC for it from the MSC, the iBSC, in the absence of more specific location information for that Mobile, carries out the standard iBS Paging procedure, i.e. paging it in ALL iBSs sharing the specified LAC/CGI (see section 3.1.1).

Another alternative is to maintain the MS location information in the iBSC's VLR until the next MTC for that MS arrives. The iBSC will then use a 2-tier paging procedure: Try to page the MS in the last known iBS first and only if unsuccessful with this, perform the standard iBS paging procedure (and only then delete the then obviously invalid old location information for that MS).

Another embodiment of the invention is that the iBSC will first page the "home" cell of the mobile. During registration of a new iBS the subscriber is asked to list all mobiles for this cell, which is typically all families' mobile numbers. In this case the iBSC will first send a paging request to the home cell and if not successful it will send out the paging request to the other iBSs.

3.1.2 Mobile Originating Call (MOC)

The difference in Mobile Originating Call setups through an iBS compared to a conventional BTS is that the iBS's IP address, other internet/address related data or a serial number of the iBS is used as an additional identification of the iBS in control traffic between the iBS and the iBSC as already described in sections 2.6.1, 3.1.1 and 3.1.1.1, since the CGI (which is normally used for this purpose) of an iBS is not unique as in a conventional network but shared between several or many iBSs. So the call is set up through the iBSC and MSC like any other mobile originated call.

3.2 Handover 3.2.1 Macrocell-to-iBS Handover

This kind of handover is the one that is the most affected by the particularities of the iBS system, due to the fact that the neighbor relations for such handovers have to be pre-defined in the BSCs where there is only a limited number of postitions available for neighbor relations (32 per cell in most manufacturers' BSCs, 64 in some).

In a conventional network, in its measurement reports, the MS reports the downlink signal strength and the BSIC it receives on the frequencies in the neighbor list of the currently serving (macrocell) BTS. This neighbor list (a list of frequencies to be monitored) was given to the MS by the BTS on the BCCH and includes the e.g. 3 frequencies assigned exclusively to iBS use network-wide (iBS frequencies).

The measurement reports end up in the BSC which has a reference list (the adjacency list) linking the reported BSICs and frequencies to the correct handover target cells with their LACs and CIs. A Channel Activation request is then sent to the relevant (most suitable, based on the BSC's handover algorithms) target cell when the need for a handover is identified.

The target cell is adressed by the BSC with its CGI which consists of the LAI and CI and is normally a globally unique cell ID. If the most suitable (e.g. the strongest) target cell is an iBS, the handover request will be sent to the relevant iBSC (via the MSC). The handover request message also contains the CGI of the cell that the handover originated from (the "old cell"), so the iBSC will send a channel activation request to every iBS on the old cell's pointer list (see section 2.6.4) with the target cell CGI specified in the handover request.

This means that as soon as the number of iBSs in a macrocell area exceeds the number of CGIs available for iBSs in an MSC/iBSC area (e.g. 9), more than one iBS might have to activate a channel for the handover (and send the Channel Activation Acknowledge command back to the iBSC), but the Mobile requiring the handover will of course be heard by only 1 of them. The iBSC then identifies which iBS (uniquely identified by its IP address) within the common CGI group in a macrocell's "pointer list" (see section 2.6.4) is responding with the Handover Detect message, indicating that it is actually receiving the Mobile, and the iBSC then instructs all other iBSs that had activated channels for this handover to release those channels again (or they are released when a corresponding standard timer expires).

It is configurable whether the iBSC should wait before it sends the Handover Request Acknowledge message back to the MSC until ALL iBSs (if more than 1) addressed for that handover have responded with a Channel Activation Acknowledge message, or whether the Handover Request Acknowledge message should already be sent when the first iBS or a certain percentage of the addressed iBSs have responded.

All iBSs addressed in parallel as the possible target cell in such a macrocell-to-iBS handover will have to activate the same channel (i.e. the same time slot number on the same frequency) for taking over the call, because the GSM system requires this in its handover signaling specification. Therefore, one (or several) particular time slot number(s), e.g. time slot no. 7, is reserved in all IBSs for handover requests and never assigned to carrying other traffic. Immediately after a call has been handed over to time slot no. 7 of an IBS, the call will be transferred to another time slot in an Intracell Handover in order to free time slot no. 7 for the next handover request.

Figure 5:
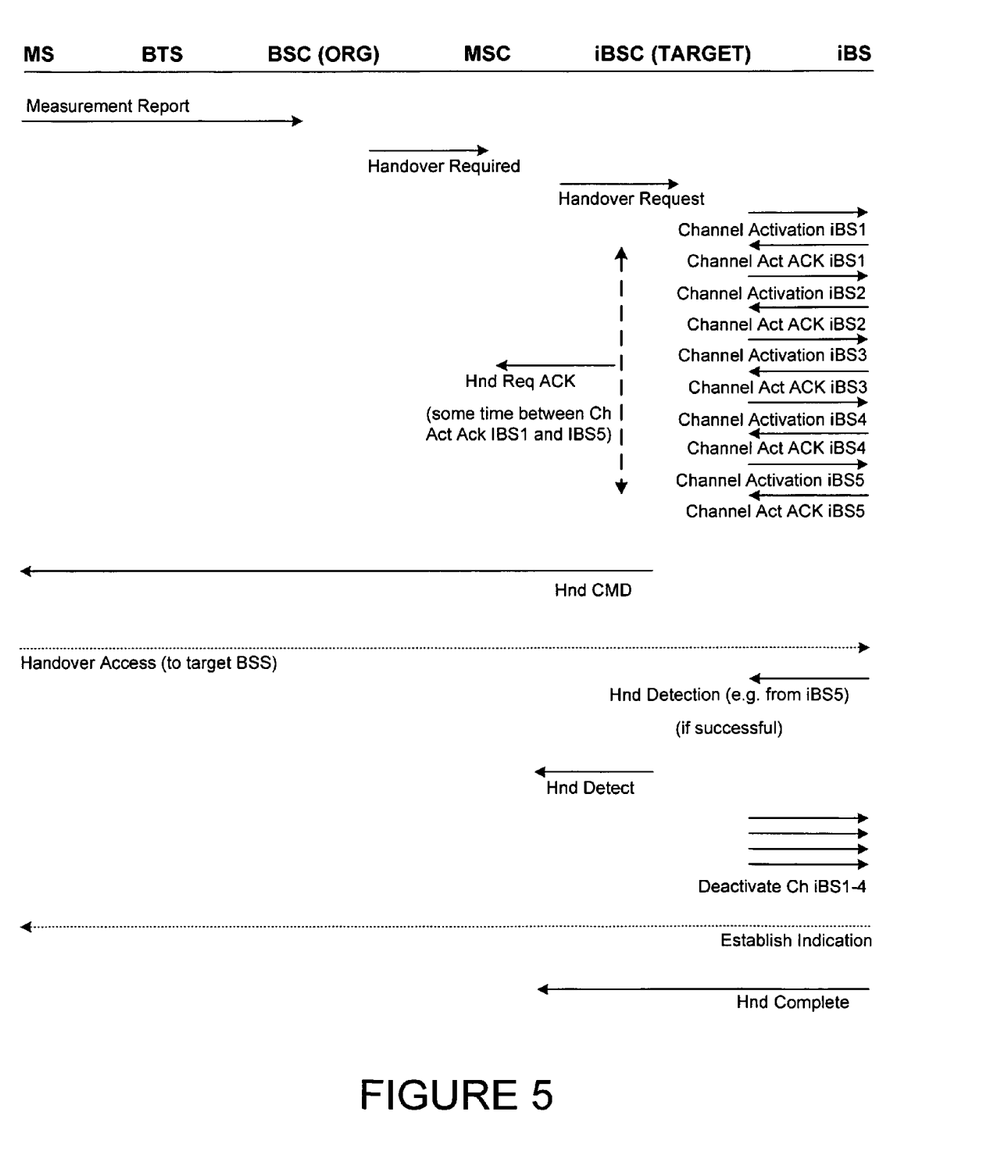
FIG. 5 is a diagram showing the message flow for a macrocell-to-iBS handover with five iBSs in the macrocell's pointer list sharing a common CGI.

The message flow for a macro-to-iBS handover with 5 iBSs in the macrocell's pointer list sharing a common CGI is shown in FIG. 5.

3.2.2 iBS-to-Macrocell Handover

The iBS-to-Macrocell handover is actually the standard GSM handover procedure and does not involve the overhead in signaling and channel activations as described for the reverse case in section 3.2.1 because the neighbor relations for iBSs can be written or rewritten in the iBSC by the iSM (see section 2.6.1) when a new iBS goes online.

A Mobile being served by an iBS will send its measurement reports via the iBS to the iBSC where the reported signal strengths, ARFCNs and BSICs of received neighbor cells are evaluated. The iBSC, as a result of the radio environment investigation as described in section 1, will have an adjacency list for each iBS, linking the reported ARFCNs and BSICs to the CGI of each neighbor cell. When the iBSC determines the need for a handover it will send a handover request to the relevant target cell (via the MSC), addressing it with its CGI. After completion of the handover the iBSC will clear the channel in the "old" (iBS) cell.

3.2.3 iBS-to-iBS Handover

This procedure is composed of elements of the other 2 handover procedures described above in sections 3.2.2 and 3.2.1. It starts out like an iBS-to-macrocell handover as described in section 3.2.2 in the way how the most suitable target cell for a handover from an iBS cell is identified. The target cell is now however not a macrocell but another iBS, which means that the CGI of the target cell may now not uniquely be identifying a single iBS but a group of iBSs sharing this CGI, so the relevant part of the macrocell-to-iBS handover procedure (see section 3.2.1) applies. The iBS pointer list of an iBS is however typically much shorter than a typical iBS pointer list of a macrocell since an iBS will typically have much fewer other iBSs as physical neighbors (if any) than a macrocell—see section 2.6.4. Most iBS-to-iBS handovers will in practice be intra-iBSC/MSC handovers, which means the old and the new iBS cell involved in the handover belong to the same iBSC/MSC.

Another possibility is that the iBSC can handle more than 32 or 64 neighbors, this is important if some iBSs would be installed outdoors with a larger cell radius, so many cells could be a in the neighboring list.

4. Location Verification of an iBS

The U.S. patent application Ser. No. 10/280,733 entitled "Internet Base Station" suggests using the macro cell information at the iBS site. In case the iBS does not see any macro cell information other methods can be used to verify the iBS location:

4.1 GPS

The iBS has an integrated GPS receiver and reports the coordinates to the iSM. This is the easiest way but it increases the cost of the iBS. The registration procedure with the iSM could be done without any data entered by the subscriber.

4.2 Location Information of the Mobile Handset

If during the registration process the mobile station is switched on and has a link to the macro cell network, the mobile can transmit the cell information (strongest cell, neighboring list etc.) or coordinates to the iSM.

This can be done by setting up a call from the iSM to the mobile station, downloading a cookie (e.g. SIM toolkit) so that the mobile will send this information to the iSM. The mobile can either have an integrated GPS receiver or compute the coordinates based on other information.

Alternatively the HLR of the MSC will send the last cell information to the iSM. If the mobile station is switched off, the mobile will send a log-off message to the HLR and indicate the new status and last location of the mobile.

As an alternative the mobile station information could be send through a Bluetooth or WiFi connection between the mobile station and the iBS.

The E911-system could be used to get coordinates from the mobile and transmit the data to the iSM. In this case the mobile will be asked to send access bursts, so that the E911-receivers can receive the mobile as well.

It is important that the transmission of the information through Bluetooth or WiFi happens within seconds or minutes rather than hours or days, since the mobile station can be moved in the mean time.

Once the location is confirmed the iBS transmitter can be switched on and the iBS can start the operation.

Other embodiments and implementations of the invention will be or will become apparent to one with skill in the art. All such additional embodiments and implementations are intended to be included within this description, to be within the scope of the invention and to be protected by the accompanying claims.

The invention claimed is:

1. A communications system comprising:
   a radio base station for a wireless communication network, configured for connection to a central base station controller device, configured for collection of information about other surrounding base stations through its radio receiver and, based on the collected information and other carrier-specific requirements, configured to automatically integrate into the network with the aid of a central configuration device;
   a mobile switching center (MSC);
   a configuration device; and
   a base station controller device communicatively coupled with the configuration device, the base station controller to handle communication between the base station and MSC, the base station controller device to use the public Internet for communication with the surrounding base stations, the base station controller device to maintain a base station list to indicate neighboring macrocells to which a handover may occur, wherein the list includes one or more wireless channel condition measurements used to select a target macrocell for the handover, the base station controller device further to maintain a list of interference neighbors, wherein the base station scans the downlink frequency band for BCCH (Broadcast Control Channel) signals from other base stations, measures the received signal strength, decodes broadcast parameters of these base stations including one or more of: the CGI (Cell Global Identifier, which contains the Location Area Code (LAC) and the Cell Identifier (CI)), the BSIC (Base Station Identity Code) and the neighbor cell list and reports the measurements to the configuration device further wherein location area codes (LACs) and cell identifiers (CIs) are pre-defined for each MSC or for each BSC in the network, that are separate from LACs and CIs used by conventional base stations in the network, so that a plurality of base stations share a common cell global identifier (CGI) and a common LAC and CI;
   wherein the configuration device has information stored about location area codes (LACs) used by different MSCs or BSCs of the network and, based on this information and on the measurements of the base station assigns a LAC to the base station out of the pre-defined set of LACs that belongs to the same MSC or BSC controlling the location area that the base station's strongest neighbor cell belongs to, as well as linking that base station via the Internet to the base station controller connected to the same MSC.

2. A system as claimed in claim 1 wherein the wireless network is selected from a group consisting of a GSM network, a CDMA network and a 3G network.

3. A system as claimed in claim 1 wherein the base station utilizes a combination of network configuration parameter settings that allows full interoperation of the base station with the network for roaming and handover, without the need to modify parameter settings in other existing network elements.

4. A system as claimed in claim 3 wherein the combination of parameter settings makes the deployment of very large numbers of base stations in very high densities possible while maintaining full interoperation between them.

5. A system as claimed in claim 1 wherein the base station receiver operates in the downlink frequency band (base to mobile station) as well as the uplink frequency band (mobile to base station).

6. A system as claimed in claim 1 wherein the configuration device stores information about frequencies available to a carrier and automatically assigns a suitable radio frequency to the base station based on the measurements of the base station.

7. A system as claimed in claim 6 wherein the configuration device stores information about frequencies used as BCCH frequencies in the network and assigns to the base station the one among those frequencies where the lowest interference signal levels are received in the measurements.

8. A system as claimed in claim 7 wherein the configuration device identifies a strongest other base station that the base station can receive and assigns to that base station the same frequency that is also used as the BCCH frequency by the weakest received neighbor cell of the strongest other base station.

9. A system as claimed in claim 1 and further comprising:
   a configuration device that stores information about frequencies available to a carrier and automatically assigns a suitable radio frequency to a base station, based on that information and on a random or cyclic algorithm.

10. A system as claimed in claim 1 and further comprising:
    a configuration device that links the base station to the base station controller using a geographical database comprising zip code areas and/or individual streets in combination with location information provided by a user of the base station during activation.

11. A system as claimed in claim 1 wherein the configuration device uses a random or cyclic algorithm to ensure that the pre-defined LACs are evenly distributed among all base stations within an MSC area or BSC area.

12. A system as claimed in claim 1 and further comprising:
    a configuration device that, based on the measurement reports, identifies other base stations that are adjacent to the base station and assigns the same LAC to it.

13. A system as claimed in claim 1 and wherein the configuration device, based on the measurement reports, identifies other base stations are adjacent to the base station and assigns a different LAC to it out of the pre-defined set of LACs.

14. A system as claimed in claim 1 wherein frequencies to be used by the base station are pre-defined that are different from the frequencies used by other base stations in the network and added to neighbor lists of those other base stations in the network and to their neighbor cell descriptions in their BSCs.

15. A system as claimed in claim 1 wherein all BCCH frequencies used in the network are pre-defined as possible frequencies to be used by the base station and added to neighbor lists of those other base stations in the network and to their neighbor cell descriptions in their BSCs.

16. A system as claimed in claim 1 wherein the configuration device, based on the signal level measurement reports of the base station, identifies other base stations are adjacent to the base station, adds the BCCH frequencies of the adjacent base stations to the neighbor list of the base station and adds cell descriptions of the adjacent base stations to the base station's neighbor list in the base station controller, wherein the cell descriptions contain the adjacent base stations' radio frequency (ARFCN), CGI (cell global identifier) and BSIC (base station identity code).

17. A system as claimed in claim 1 wherein a certain number of neighbor cell descriptions are reserved in a conventional base station controller for descriptions of the base stations as neighbors to the conventional base station, and filed with pre-defined parameters including at least one of: the radio frequencies (ARFCN), the cell global identifiers (CGI) and the base station identity codes (BSIC) that the base stations will use.

18. A system as claimed in claim 1 wherein a certain number of base station identity codes (BSIC) are assigned for use by the base stations and written into pre-defined neighbor lists for all conventional base stations in the network that are stored in a conventional base station controller.

19. A system as claimed in claim 1 wherein the configuration device stores information about base station identity codes (BSIC) used in the network and, based on this information and on the measurement reports from the base station, assigns a BSIC to the base station that differs from the strongest other base station in the area using the same radio frequency.

20. A system as claimed in claim 1 wherein the configuration device, based on the measurement reports from the base stations, creates for every base station in the network a pointer list of base stations that are adjacent to that base station and transfers that list to the base station controller that is connected to the same MSC that that base station is connected to.

21. A system as claimed in claim 20 wherein the base station controller uses the pointer list to direct handovers from one base station to another base station that is on that base station's pointer list.

22. A system as claimed in claim 1 wherein the base station controller keeps a record for every base station of which mobiles have last performed a location update procedure with that base station and polls those mobiles in regular intervals to establish whether they are still in that base station's coverage area, or alternatively deletes a mobile's record after it has been inactive for a specified period of time.

23. A system as claimed in claim 22 wherein the base station controller uses the mobile's records to direct mobile terminating calls (MTC) to one particular base station only.

24. A system as claimed in claim 23 wherein the base station controller, when receiving a handover request message from the MSC it is connected to, sends a channel activation command to all base stations that share a CGI specified as the handover target in the handover request message and that are on the pointer list of the base station where the handover request was initiated, that base station being identified by its CGI in the handover request message.

25. A system as claimed in claim 24 wherein the base station controller, when receiving a handover detection message from a base station in response to a channel activation command, signals to all other base stations that the same channel activation command was sent to release the activated channel again.

26. A system as claimed in claim 1 wherein the base station controller, when addressing the base station that is sharing a common CGI with other such base stations, uses an IP address to address that base station.

27. A system as claimed in claim 1 wherein the configuration device, when addressing the base station, shares a common CGI with other such base stations and uses an IP address to address that base station.

28. A system as claimed in claim 26 wherein a call taken over in the handover is immediately transferred from its original channel to another channel in order to clear the original channel for further handover requests.

29. A system as claimed in claim 1, wherein the base station controller allows greater than 64 neighbor relations per cell.

30. A system as claimed in claim 1 wherein transmit power level is adjusted, between a minimum and maximum value, according to user input about radio coverage objectives.

31. A system as claimed in claim 1 wherein transmit power level is adjusted, between a minimum and maximum value, based on a number of neighbor cells that the base station was able to receive in its measurements.

32. A system as claimed in claim 1 wherein transmit power level is adjusted, between a minimum and maximum value, based on average signal levels and bit error rates reported by mobile stations served.

33. A system as claimed in claim 1 wherein the base station continuously monitors signal levels and bit error rates reported from mobile stations served and reselects a new suitable frequency when poor radio conditions persist over a certain period of time.

34. A system as claimed in claim 1, wherein the base station has an integrated GPS receiver for determining its location.

35. A system as claimed in claim 1, wherein the base station has an integrated Bluetooth or WiFi transceiver to communicate locally with mobile stations and exchange location information.

* * * * *

UNITED STATES PATENT AND TRADEMARK OFFICE
CERTIFICATE OF CORRECTION

PATENT NO. : 7,477,920 B2
APPLICATION NO. : 10/913877
DATED : January 13, 2009
INVENTOR(S) : Scheinert et al.

It is certified that error appears in the above-identified patent and that said Letters Patent is hereby corrected as shown below:

Title page, item 57, Abstract: after "allow" delete, "fill" and insert --full--.

Signed and Sealed this

Twenty-seventh Day of July, 2010

David J. Kappos
*Director of the United States Patent and Trademark Office*